(12) United States Patent
Matsuyama et al.

(10) Patent No.: US 9,034,091 B2
(45) Date of Patent: May 19, 2015

(54) INKJET RECORDING INK SET, INKJET RECORDING METHOD, AND RECORDED MATTER

(75) Inventors: Akihiko Matsuyama, Kanagawa (JP); Kiyofumi Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 58 days.

(21) Appl. No.: 13/582,870

(22) PCT Filed: Feb. 23, 2011

(86) PCT No.: PCT/JP2011/054668
§ 371 (c)(1),
(2), (4) Date: Sep. 5, 2012

(87) PCT Pub. No.: WO2011/108556
PCT Pub. Date: Sep. 9, 2011

(65) Prior Publication Data
US 2012/0328854 A1 Dec. 27, 2012

(30) Foreign Application Priority Data
Mar. 5, 2010 (JP) .................................. 2010-049226

(51) Int. Cl.
*C09D 11/02* (2014.01)
*G01D 11/00* (2006.01)
*C09D 11/40* (2014.01)

(52) U.S. Cl.
CPC ..................... *C09D 11/40* (2013.01)

(58) Field of Classification Search
CPC ..................................................... C09D 11/54
USPC ....................................... 106/31.58
See application file for complete search history.

(56) References Cited

U.S. PATENT DOCUMENTS

| | | | |
|---|---|---|---|
| 5,431,720 A | 7/1995 | Nagai et al. | |
| 5,462,592 A | 10/1995 | Murakami et al. | |
| 5,514,208 A | 5/1996 | Nagai et al. | |
| 5,622,550 A | 4/1997 | Konishi et al. | |
| 5,810,915 A | 9/1998 | Nagai et al. | |
| 5,879,439 A | 3/1999 | Nagai et al. | |

(Continued)

FOREIGN PATENT DOCUMENTS

| | | |
|---|---|---|
| CN | 1863879 A | 11/2006 |
| CN | 101200609 A | 6/2008 |

(Continued)

OTHER PUBLICATIONS

Combined Chinese Office Action and Search Report issued Sep. 13, 2013 in Patent Application No. 201180012543.X (with English language translation).

(Continued)

*Primary Examiner* — Veronica F Faison
(74) *Attorney, Agent, or Firm* — Oblon, McClelland, Maier & Neustadt, L.L.P.

(57) ABSTRACT

An inkjet recording ink set including a black ink and color inks, wherein the black ink and the color inks each contain at least a dye, a water-soluble solvent and water and each have a viscosity of 5 mPa·s to 20 mPa·s at 25° C., and wherein the respective color inks each satisfy a mass ratio relationship of S/W≥1, and the black ink satisfies a mass ratio relationship of S/W<1, where S denotes an amount of the water-soluble solvent contained in the respective inks, and W denotes an amount of the water contained in the respective inks.

20 Claims, 2 Drawing Sheets

(56) References Cited

U.S. PATENT DOCUMENTS

| | | | |
|---|---|---|---|
| 5,882,390 | A | 3/1999 | Nagai et al. |
| 5,948,154 | A | 9/1999 | Hayashi et al. |
| 5,972,082 | A | 10/1999 | Koyano et al. |
| 5,993,524 | A | 11/1999 | Nagai et al. |
| 6,080,229 | A * | 6/2000 | Watanabe et al. ......... 106/31.43 |
| 6,120,589 | A | 9/2000 | Bannai et al. |
| 6,214,099 | B1 * | 4/2001 | Ueda et al. ............... 106/31.57 |
| 6,231,652 | B1 | 5/2001 | Koyano et al. |
| 6,261,349 | B1 | 7/2001 | Nagai et al. |
| 6,613,136 | B1 | 9/2003 | Arita et al. |
| 6,688,737 | B2 | 2/2004 | Nagai et al. |
| 6,918,662 | B2 | 7/2005 | Arita et al. |
| 7,094,813 | B2 | 8/2006 | Namba et al. |
| 7,278,726 | B2 | 10/2007 | Nagai |
| 7,284,851 | B2 | 10/2007 | Bannai et al. |
| 7,370,952 | B2 | 5/2008 | Inoue et al. |
| 7,682,011 | B2 | 3/2010 | Namba et al. |
| 7,699,457 | B2 | 4/2010 | Namba et al. |
| 2002/0083866 | A1 | 7/2002 | Arita et al. |
| 2002/0096085 | A1 | 7/2002 | Gotoh et al. |
| 2003/0010252 | A1 | 1/2003 | Arita et al. |
| 2003/0038869 | A1 | 2/2003 | Kaneko et al. |
| 2003/0064206 | A1 | 4/2003 | Koyano et al. |
| 2003/0107632 | A1 | 6/2003 | Arita et al. |
| 2004/0155946 | A1 * | 8/2004 | Nagai ........................ 347/100 |
| 2005/0007431 | A1 | 1/2005 | Koyano et al. |
| 2005/0168552 | A1 | 8/2005 | Arita et al. |
| 2006/0034984 | A1 | 2/2006 | Baydo et al. |
| 2006/0176349 | A1 | 8/2006 | Nagai et al. |
| 2006/0232651 | A1 | 10/2006 | Sugimoto et al. |
| 2007/0197685 | A1 | 8/2007 | Aruga et al. |
| 2007/0221079 | A1 | 9/2007 | Aruga et al. |
| 2007/0225403 | A1 | 9/2007 | Lee |
| 2008/0092773 | A1 * | 4/2008 | Matsuyama ............... 106/31.65 |
| 2008/0138519 | A1 | 6/2008 | Habashi et al. |
| 2008/0248260 | A1 | 10/2008 | Kojima et al. |
| 2008/0254228 | A1 | 10/2008 | Kojima et al. |
| 2008/0273045 | A1 | 11/2008 | Morohoshi et al. |
| 2008/0280044 | A1 | 11/2008 | Okamura et al. |
| 2008/0302268 | A1 | 12/2008 | Arita et al. |
| 2009/0035468 | A1 | 2/2009 | Matsuyama et al. |
| 2009/0043028 | A1 | 2/2009 | Matsuyama et al. |
| 2009/0047431 | A1 | 2/2009 | Hatada et al. |
| 2009/0098312 | A1 | 4/2009 | Goto et al. |
| 2009/0114121 | A1 | 5/2009 | Morohoshi et al. |
| 2009/0130313 | A1 | 5/2009 | Ohshima et al. |
| 2009/0162569 | A1 | 6/2009 | Morohoshi et al. |
| 2009/0176070 | A1 | 7/2009 | Goto et al. |
| 2009/0186162 | A1 | 7/2009 | Namba et al. |
| 2009/0234058 | A1 | 9/2009 | Sasada |
| 2009/0239044 | A1 | 9/2009 | Habashi et al. |
| 2009/0258196 | A1 | 10/2009 | Nagashima et al. |
| 2009/0263632 | A1 | 10/2009 | Kojima et al. |
| 2009/0291213 | A1 | 11/2009 | Ohshima et al. |
| 2010/0020142 | A1 | 1/2010 | Bannai et al. |
| 2010/0196601 | A1 | 8/2010 | Goto et al. |
| 2010/0196602 | A1 | 8/2010 | Koyano et al. |
| 2010/0196603 | A1 | 8/2010 | Ohshima et al. |
| 2010/0196673 | A1 | 8/2010 | Nagashima et al. |
| 2010/0209611 | A1 | 8/2010 | Ohshima et al. |
| 2010/0215855 | A1 | 8/2010 | Morohoshi et al. |
| 2010/0227067 | A1 | 9/2010 | Namba et al. |
| 2010/0245416 | A1 | 9/2010 | Ohshima et al. |
| 2010/0265292 | A1 | 10/2010 | Ohshima et al. |
| 2012/0207983 | A1 | 8/2012 | Matsuyama et al. |

FOREIGN PATENT DOCUMENTS

| | | |
|---|---|---|
| CN | 101302368 A | 11/2008 |
| EP | 0 588 316 A2 | 3/1994 |
| JP | 2000-239583 | 9/2000 |
| JP | 3154333 | 2/2001 |
| JP | 2003-231832 | 8/2003 |
| JP | 2003-321633 | 11/2003 |
| JP | 2006-298979 | 11/2006 |
| JP | 2007-136937 | 6/2007 |
| JP | 2007-177007 | 7/2007 |
| JP | 2008-502370 | 1/2008 |
| JP | 2008-179804 | 8/2008 |

OTHER PUBLICATIONS

International Search Report Issued May 17, 2011 in PCT/JP2011/054668 Filed Feb. 23, 2011.

U.S. Appl. No. 13/582,662, filed Sep. 4, 2012, Matsuyama, et al.

* cited by examiner

INKJET RECORDING INK SET, INKJET RECORDING METHOD, AND RECORDED MATTER

TECHNICAL FIELD

The present invention relates to an inkjet recording ink set, an inkjet recording method, and a recorded matter.

BACKGROUND ART

Recently, inkjet printers have become popular rapidly, because of their advantageous points, for example, of low noise properties, and low running cost. Also, color inkjet printers which enable printing on plain paper have been actively brought into the market. However, it is difficult to satisfy all the properties required for recording ink used for such inkjet recording system, such as color reproducibility, abrasion resistance, durability, light resistance and quick drying properties of a printed image, and letter bleeding (feathering), color boundary bleeding (color bleeding), double sided printing properties, and discharge stability of recording ink, and thus an ink is selected depending on the properties given priority according to the application, under present circumstances.

In most cases, an inkjet recording ink contains water as the main component and contains a wetting agent such as glycerin, and a colorant. As the colorant, dyes and pigments are mainly used. The dyes are excellent in color developing ability and storage stability but have a drawback that they are poor in light resistance, gas resistance and water resistance. In contrast, pigments are excellent in light resistance, gas resistance and water resistance, but have a drawback that they are poor in color developing ability.

Further, a dye ink using a dye as a colorant has a problem that it easily spreads on paper such as plain paper, and how to reduce bleeding (color bleeding) particularly in a boundary between a black ink and a color ink has become a problem to be solved.

As a solution to the color bleeding, there is a method of increasing the permeability of a color ink to paper higher than that of a black ink, to thereby prevent the black ink from penetrating a region of the color ink of a printed image. An attempt is made to solve the problem with color bleeding by adding a surfactant to the ink composition and adjusting the amount of the surfactant, however, a reduction of color bleeding by dye inks has not yet been made as efficient as pigment inks are. Also, there is a method to suppress the permeability of a color ink by increasing the viscosity of the black ink, however, since there is an upper limit to the viscosity for stably discharging the ink in an inkjet recording system, a sufficient effect has not yet been obtained.

PTL 1 discloses an ink set in which the amount of a water-soluble solvent is greater than that of water, and both a black ink and color inks contain the water-soluble solvent in an amount greater than that of water. However, the ink has a problem that color bleeding is easily caused between the black ink and the color inks.

An ink which is monochrome and contains a water-soluble solvent in an amount greater than that of water is described in PTLs 1 to 5 and the like, but these inks do not take the color bleeding into account.

CITATION LIST

Patent Literature

PTL 1 Japanese Patent Application Laid-Open (JP-A) No. 2007-177007

PTL 2 Japanese Patent (JP-B) No. 3154333
PTL 3 Japanese Patent Application Laid-Open (JP-A) No. 2003-261832
PTL 4 Japanese Patent Application Laid-Open (JP-A) No. 2003-321633
PTL 5 Japanese Patent Application Laid-Open (JP-A) No. 2008-502370

SUMMARY OF INVENTION

Technical Problem

The present invention aims to solve the above-mentioned conventional problems and to achieve the following object. That is, an object of the present invention is to provide an inkjet recording ink set which enables reducing bleeding at a boundary between a black ink and color inks in aqueous recording inks using dyes as colorants, and improving discharge reliability of the aqueous inks, an inkjet recording method and a recorded matter each using the inkjet recording ink set.

Solution to Problem

Means for solving the above-mentioned problems are as follows:
<1> An inkjet recording ink set including:
 a black ink and color inks,
 wherein the black ink and the color inks each contain at least a dye, a water-soluble solvent and water and each have a viscosity of 5 mPa·s to 20 mPa·s at 25° C., and
 wherein the respective color inks each satisfy a mass ratio relationship of S/W≥1, and the black ink satisfies a mass ratio relationship of S/W<1, where S denotes an amount of the water-soluble solvent contained in the respective inks, and W denotes an amount of the water contained in the respective inks.
<2> The inkjet recording ink set according to <1> above, wherein each of the color inks satisfies a mass ratio relationship of 1≤S/W≤1.6, and the black ink satisfies a mass ratio relationship of 0.7≤S/W<1.
<3> The inkjet recording ink set according to one of <1> and <2> above, wherein the color inks include a cyan ink, a magenta ink, and a yellow ink.
<4> An inkjet recording method including:
 discharging the respective inks in the inkjet recording ink set according to any one of <1> to <3> above using an ink flying unit configured to make the respective inks fly by applying an impulse to the respective inks to thereby record an image.
<5> A recorded matter,
 wherein the recorded matter is recorded using the inkjet recording ink set according to any one of <1> to <3> above.

Advantageous Effects of Invention

The present invention can solve the above-mentioned conventional problems and provide an inkjet recording ink set which enables reducing bleeding at a boundary between a black ink and color inks in aqueous recording inks using dyes as colorants, and improving discharge reliability of the aqueous inks, an inkjet recording method and a recorded matter each using the inkjet recording ink set.

DESCRIPTION OF EMBODIMENTS (Inkjet Recording Ink Set)

An inkjet recording ink set (which may be referred to as an ink set hereinbelow.) according to the present invention includes a black ink and color inks, and the black ink and the color inks each contain at least a dye, a water-soluble solvent and water and contains other components as required.

Each of these inks has a viscosity of 5 mPa·s to 20 mPa·s at 25° C.

When the viscosity is lower than 5 mPa·s, mist and satellite take place when the inks are discharged from inkjet nozzles, and the image quality tends to degrade. In addition, because of excessively high permeability of the inks, ink bleeding is liable to occur between the black ink and the color inks.

When the viscosity is higher than 20 mPa·s, the discharge of the inks from inkjet nozzles becomes unstable to cause discharge bending of ink, and thus adverse influences upon images occur, for example, solid parts of an image may not be sufficiently filled with the ink, and the outline of letters blurs.

In the ink set of the present invention, as to a mass ratio (S/W) of a water-soluble content (the amount of the water-soluble solvent) S to a water content (the amount of the water) W in each of the inks, each of the color inks should satisfy a mass ratio relationship of S/W≥1. However, when the mass ratio S/W is excessively great (for example, 3 or greater), unfavorably, the dye cannot be dissolved and is precipitated and crystallized, which may cause discharge bending of ink and non-discharge of ink. Further, even when the mass ratio S/W is greater than 1.6, the permeability of the color ink becomes high to cause an off-balance condition with the black ink, and thus ink bleeding is liable to occur. For this reason, the color inks preferably satisfy 1≤S/W≤1.6.

The black ink should satisfy a mass ratio relationship of S/W<1. However, when the mass ratio S/W is smaller than 0.2, unfavorably, water in the black ink is evaporated from inkjet nozzles due to degradation of the moisture retention properties of the water-soluble solvent, and the viscosity of the black ink becomes higher than 20 mPa·s, which may cause discharge bending of ink, and the like. Further, even when the mass ratio S/W is smaller than 0.7, the permeability of the black ink becomes low to cause an off-balance condition with the color inks, and thus ink bleeding is liable to occur. For this reason, the black ink preferably satisfies a mass ratio relationship of 0.7≤S/W<1.

In the ink set of the present invention, the kind of the color inks is not particularly limited. The most popular combination of colors is cyan, magenta, and yellow.

Further, when a water-soluble solvent having a high boiling point and low volatility is used, the inks can be made to have no flash point. When such inks are used, the inks have less change in physical properties due to evaporation of the water-soluble solvent, and thus stable discharge can be obtained even in long-term storage. In addition, it is preferable that the inks have no flash point to secure the safety of the products.

<Dye>

The dye is not particularly limited and may be suitably selected in accordance with the intended use. However, a water-soluble dye is preferable. Examples of the water-soluble dye include direct dyes, acid dyes, basic dyes, and reactive dyes. Specific examples are those listed below, but are not limited thereto.

—Direct Dye—

Specific examples of the direct dyes (trade name) include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, 247 and the like; C.I. Direct Violet 7, 9, 47, 48, 51, 66, 90, 93, 94, 95, 98, 100, 101 and the like; C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163 and the like; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291 and the like; and C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 195, 199 and the like.

—Acid Dye—

Specific examples of the acid dyes (trade name) include C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397 and the like; C.I. Acid Violet 5, 34, 43, 47, 48, 90, 103, 126 and the like; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227 and the like; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326 and the like; and C.I. Acid Black 7, 24, 29, 48, 52:1, 172 and the like.

—Basic Dye—

Specific examples of the basic dyes (trade name) include C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91 and the like; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112 and the like; C.I. Basic Violet 1, 3, 7, 10, 11, 27 and the like; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155 and the like; and C.I. Basic Black 2, 8 and the like.

—Reactive Dye—

Specific examples of the reactive dyes (trade name) include C.I. Reactive Yellow 1, 2, 3, 5, 11, 13, 14, 15, 17, 18, 20, 21, 22, 23, 24, 25, 26, 27, 29, 35, 37, 40, 41, 42, 47, 51, 55, 65, 67 and the like; C.I. Reactive Red 1, 3, 13, 14, 17, 19, 21, 22, 23, 24, 25, 26, 29, 31, 32, 35, 37, 40, 41, 43, 44, 45, 46, 49, 55, 60, 66, 74, 79, 96, 97, 180 and the like; C.I. Reactive Violet 1, 3, 4, 5, 6, 7, 8, 9, 16, 17, 22, 23, 24, 26, 27, 33, 34 and the like; C.I. Reactive Blue 1, 2, 3, 5, 7, 8, 10, 13, 14, 15, 17, 18, 19, 21, 23, 25, 26, 27, 28, 29, 32, 35, 38, 41, 63, 80, 95 and the like; and C.I. Reactive Black 3, 4, 5, 7, 8, 11, 12, 14, 17, 21, 23, 26, 31, 32, 34 and the like.

<Water-Soluble Solvent>

An ink according to the present invention uses water as a liquid medium. Besides water, a water-soluble solvent is used in combination for various purposes, such as a wetting agent for preventing dryness of the ink and a penetrant for imparting permeability to the ink.

The water-soluble solvent is not particularly limited and may be suitably selected in accordance with the intended use. Examples of the water-soluble solvent include polyhydric alcohols, polyhydric alcohol alkyl ethers, polyhydric alcohol aryl ethers, nitrogen-containing heterocyclic compounds, amides, amines, and sulfur-containing compounds.

The polyhydric alcohols are not particularly limited and may be suitably selected in accordance with the intended use.

Examples thereof include ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, 1,5-pentanediol, 2,2,4-trimethyl-1,3-pentanediol, 2-ethyl-1,3-hexanediol, 1,6-hexanediol, hexane glycol, glycerin, trimethylol ethane, trimethylol propane, 1,2,3-butanetriol, 1,2,4-butanetriol, 1,2,6-hexanetriol, and petriol.

The polyhydric alcohol alkyl ethers are not particularly limited and may be suitably selected in accordance with the intended use. Examples thereof include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

The polyhydric alcohol aryl ethers are not particularly limited and may be suitably selected in accordance with the intended use. Examples thereof include ethylene glycol monophenyl ether, and ethylene glycol monobenzyl ether.

The nitrogen-containing heterocyclic compounds are not particularly limited and may be suitably selected in accordance with the intended use. Examples thereof include 2-pyrrolidone, N-methyl-2-pyrrolidone, N-hydroxyethyl-2-pyrrolidone, 1,3-dimethylimidazolidinone, ε-caprolactam, and γ-butylolactam.

The amides are not particularly limited and may be suitably selected in accordance with the intended use. Examples thereof include formamide, N-methylformamide, and N,N-dimethylformamide.

The amides are not particularly limited and may be suitably selected in accordance with the intended use. Examples thereof include monoethanolamine, diethanolamine, triethanolamine, monoethylamine, and triethylamine.

The sulfur-containing compounds are not particularly limited and may be suitably selected in accordance with the intended use. Examples thereof include dimethylsulfoxide, sulfolane, and thiodiethanol.

As the water-soluble solvent, besides the above-mentioned compounds, propylene carbonate and ethylene carbonate are exemplified.

These water-soluble solvents may be used alone or in combination.

Among these water-soluble solvents, glycerin, diethylene glycol, triethylene glycol, 1,3-butanediol, 1,6-hexanediol, propylene glycol, 1,5-pentanediol, dipropylene glycol, trimethylol propane, and 3-methyl-1,3-butanediol are particularly preferable. With use of these water-soluble solvents, excellent effects can be obtained in terms of solubility and preventing ink discharge failure due to evaporation of water.

As water-soluble solvent usable as wetting agents, there may be exemplified saccharides and derivatives thereof. Examples of the saccharides include monosaccharide, disaccharide, oligosaccharides (including trisaccharide and tetrasaccharide), and polysaccharide. Among these, glucose, mannose, fructose, ribose, xylose, arabinose, galactose, maltose, cellobiose, lactose, sucrose, trehalose, and malt triose are preferable.

Here, "polysaccharides" means saccharides in a broad sense, and include substances widely present in nature, such as α-cyclodextrin, and cellulose.

As the derivative of the saccharides, there may be exemplified reducing sugars of the saccharides [e.g., sugar alcohols (general formula: $HOCH_2(CHOH)nCH_2OH$ (where, n is an integer of 2 to 5.)]; acid sugar (e.g., aldonic acid, and crotonic acid); amino acid, and thio acid. Among these, sugar alcohol is particularly preferable. Specific examples of the sugar alcohol include maltitol, and sorbit.

Among these water-soluble solvents, glycerin, diethylene glycol, triethylene glycol, 1,3-butanediol, 1,6-hexanediol, propylene glycol, 1,5-pentanediol, dipropylene glycol, trimethylol propane, and 3-methyl-1,3-butanediol are particularly preferable as wetting agents. With use of these water-soluble solvents, it is possible to produce an ink excellent in storage stability and discharge stability.

The amount of the wetting agent in contained in the ink is not particularly limited and may be suitably selected in accordance with the intended use. It is, however, preferably 15% by mass to 75% by mass, and more preferably 35% by mass to 65% by mass. Within the range described above, the drying property, storage stability and reliability of the ink are extremely excellent. When the amount of the wetting agent is less than 15% by mass, the viscosity of the ink is increased due to evaporation of water from nozzle holes in an inkjet head, and thus the ink may not be normally discharged therefrom. When the amount of the wetting agent is more than 75% by mass, the dye cannot be dissolved in water, which may cause such a problem that nozzle holes are clogged due to crystallization and precipitation of the dye.

The appropriate surface tension of the ink in the present invention at 25° C. is 25 mN/m to 45 mN/m.

When the water-soluble solvent serving as a penetrant is added in the ink, the surface tension of the ink is decreased, and the permeation of the ink to a recording medium after an ink droplet drops on the recording medium such as paper becomes faster, and thus feathering and color bleeding can be reduced.

Among the water-soluble solvents, particularly preferred penetrants are polyols having carbon atoms of 8 to 11, such as 2-ethyl-1,3-hexanediol, and 2,2,4-trimethyl-1,3-pentanediol.

When the amount of the penetrant contained in the ink is not particularly limited and may be suitably selected in accordance with the intended use. It is, however, preferably 0.1% by mass to 5% by mass, and more preferably 0.5% by mass to 3% by mass. When the amount of the penetrant is less than 0.1% by mass, solid parts in an image cannot be covered with the ink because of insufficient permeation of the ink, which may cause a problem with degradation of image density and the like. On the other hand, a water-soluble solvent used as a penetrant has low solubility in water, and when the amount of the water-soluble solvent is more than 5% by mass, the water-soluble solvent cannot be dissolved in water, which may cause such a problem that the storage stability of the ink degrades.

As the penetrant, a surfactant may be used, besides water-soluble solvents.

The surfactant is not particularly limited and may be suitably selected in accordance with the intended use. Examples thereof include nonionic surfactants, anionic surfactants, amphoteric surfactants, silicone-based surfactants and fluorine-based surfactants. These may be used alone or in combination.

<Other Components>

Examples of the other components include an antiseptic/fungicide, an anti-corrosion agent, an antioxidant, a ultraviolet absorber, a light stabilizers, a pH adjustor, a chelating reagent, an anti-kogation agent.

—Antiseptic/Fungicide—

The antiseptic/fungicide is not particularly limited and may be suitably selected in accordance with the intended use. Examples thereof include sodium dehydroacetate, sodium sorbate, sodium 2-pyridinethiol-1-oxide, sodium benzoate, and sodium pentachlorophenol.

—Anti-Corrosion Agent—

The anti-corrosion agent is not particularly limited and may be suitably selected in accordance with the intended use. Examples thereof include acid sulfites, sodium thiosulfate, ammonium thiodiglycolate ammonium, diisopropyl ammonium nitrite, pentaerythritol tetranitrate, and dicyclohexyl ammonium nitrite.

—Antioxidant—

The antioxidant is not particularly limited and may be suitably selected in accordance with the intended use. Examples thereof include phenol-based antioxidants (including hindered phenol-based antioxidants), amine-based antioxidants, sulfur-based antioxidants, and phosphorus-based antioxidants.

—Ultraviolet Absorber—

The ultraviolet absorber is not particularly limited and may be suitably selected in accordance with the intended use. Examples thereof include a benzophenone-based ultraviolet absorber, a benzotriazole-based ultraviolet absorber, a salicylate-based ultraviolet absorber, a cyanoacrylate-based ultraviolet absorber, and a nickel complex salt-based ultraviolet absorber.

—pH Adjustor—

The pH adjustor is added in the ink for keeping the ink alkaline to stabilize the dispersed state and the discharge of the ink. However, when the pH is 11 or higher, the amount of the pH adjustor to melt an inkjet head and an ink supplying unit is unfavorably increased, which causes a problem such as deterioration and leakage of the ink and discharge failure.

The pH adjustor is not particularly limited and may be suitably selected in accordance with the intended use. Preferred pH adjustors are those containing at least one selected from an alcohol amine, an alkali metal hydroxide, a phosphonium hydroxide, and an alkali metal carbonate.

The alcohol amine is not particularly limited and may be suitably selected in accordance with the intended use. Examples thereof include diethanol amine, triethanol amine, and 2-amino-2-ethyl-1,3-propanediol.

The alkali metal hydroxide is not particularly limited and may be suitably selected in accordance with the intended use. Examples thereof include lithium hydroxide, sodium hydroxide, and potassium hydroxide.

The ammonium hydroxide is not particularly limited and may be suitably selected in accordance with the intended use. Examples thereof include ammonium hydroxide, quaternary ammonium hydroxide, and quaternary phosphonium hydroxide.

The alkali metal carbonate is not particularly limited and may be suitably selected in accordance with the intended use. Examples thereof include lithium carbonate, sodium carbonate, and potassium carbonate.

Chelating Reagent—

The chelating reagent is not particularly limited and may be suitably selected in accordance with the intended use. Examples thereof include sodium ethylenediamine tetraacetate, sodium nitrilotriacetate, sodium hydroxyethylethylenediamine triacetate, sodium diethylenetriamine pentaacetate, and sodium uramil diacetate.

—Anti-Kogation Agent—

An anti-kogation agent can be added to an ink according to the present invention.

The "kogation" is a defect caused in a thermal head which discharges inks utilizing an expanding forth of the ink when it is instantaneously heated by applying electrical current thereto, and specifically, it is a phenomenon that ink components is deteriorated when it is heated, and the deteriorated substance adheres to a heater used. When kogation occurs, heating by a heater is not normally performed, the discharging force of the ink becomes weak, and in the worst case, the ink is not discharged from an inkjet head.

The anti-kogation agent is not particularly limited and may be suitably selected in accordance with the intended use. Examples thereof include polyphosphoric acid, polyaminocarboxylic acid, aldonic acid, hydroxycarboxylic acid, polyol phosphate and salts thereof; acids having an amino group and/or salts thereof; or ammonium salts of acids having a methyl group or a methylene group and a carboxyl group.

<Recording Apparatus>

The ink set of the present invention can be suitably used in various recording apparatuses employing an inkjet recording method, for example, in an inkjet recording printer, a facsimile, a copier, a printer/facsimile/copier complex machine. In addition, the ink set has such an excellent characteristic that it does not adhere even to a recording apparatus particularly equipped with an inkjet head having an ink-repellent layer containing a fluorine-based silane coupling agent or an ink-repellent layer having a silicone resin.

Hereinafter, the outline of an inkjet recording apparatus used in Examples will be described.

Figure 1:
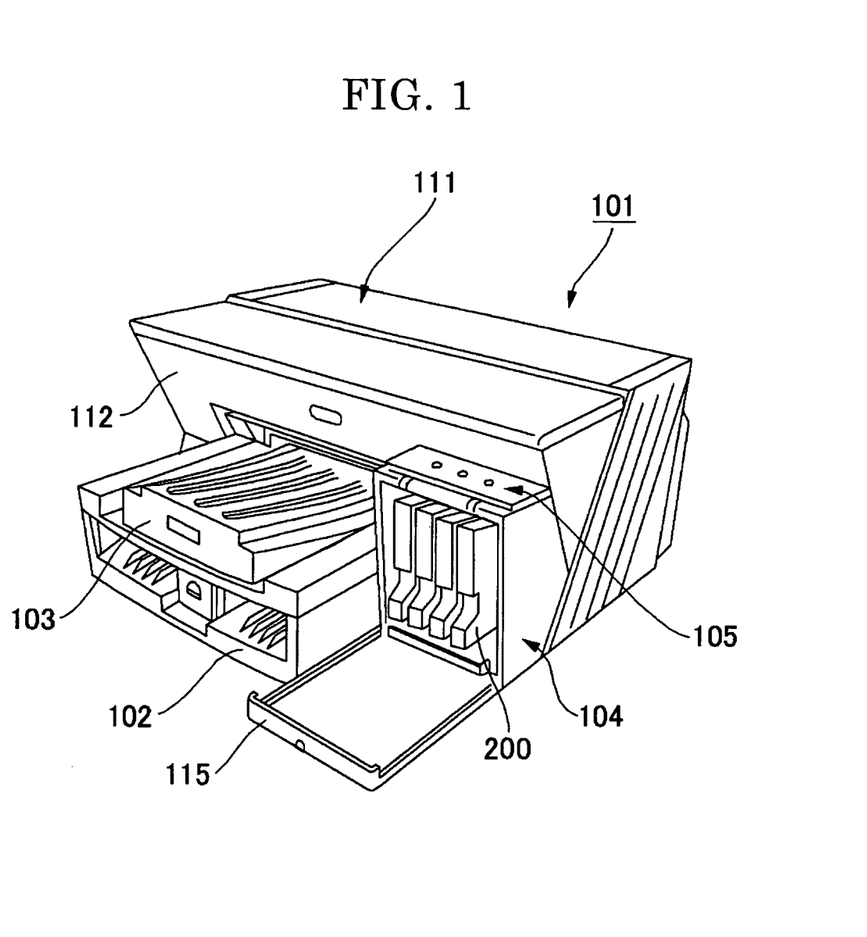
FIG. 1 is a perspective diagram illustrating an inkjet recording apparatus in a state where a cover of an ink cartridge loading unit is open.

An inkjet recording apparatus illustrated in FIG. 1 has an apparatus body 101, a paper feed tray 102 to feed paper loaded into the apparatus body 101, a paper ejection tray 103 to stock paper which is loaded into the apparatus body 101 and on which an image is recorded (formed), and an ink cartridge loading section 104. On the top face of the ink cartridge loading section 104, an operation section 105, such as operation keys and an indicator, is arranged. The ink cartridge loading section 104 has an openable and closable front cover 115 to remove and load an ink cartridge 200. Reference numeral 111 denotes a top cover and reference numeral 112 denotes the front surface of the front cover 115.

Figure 2:
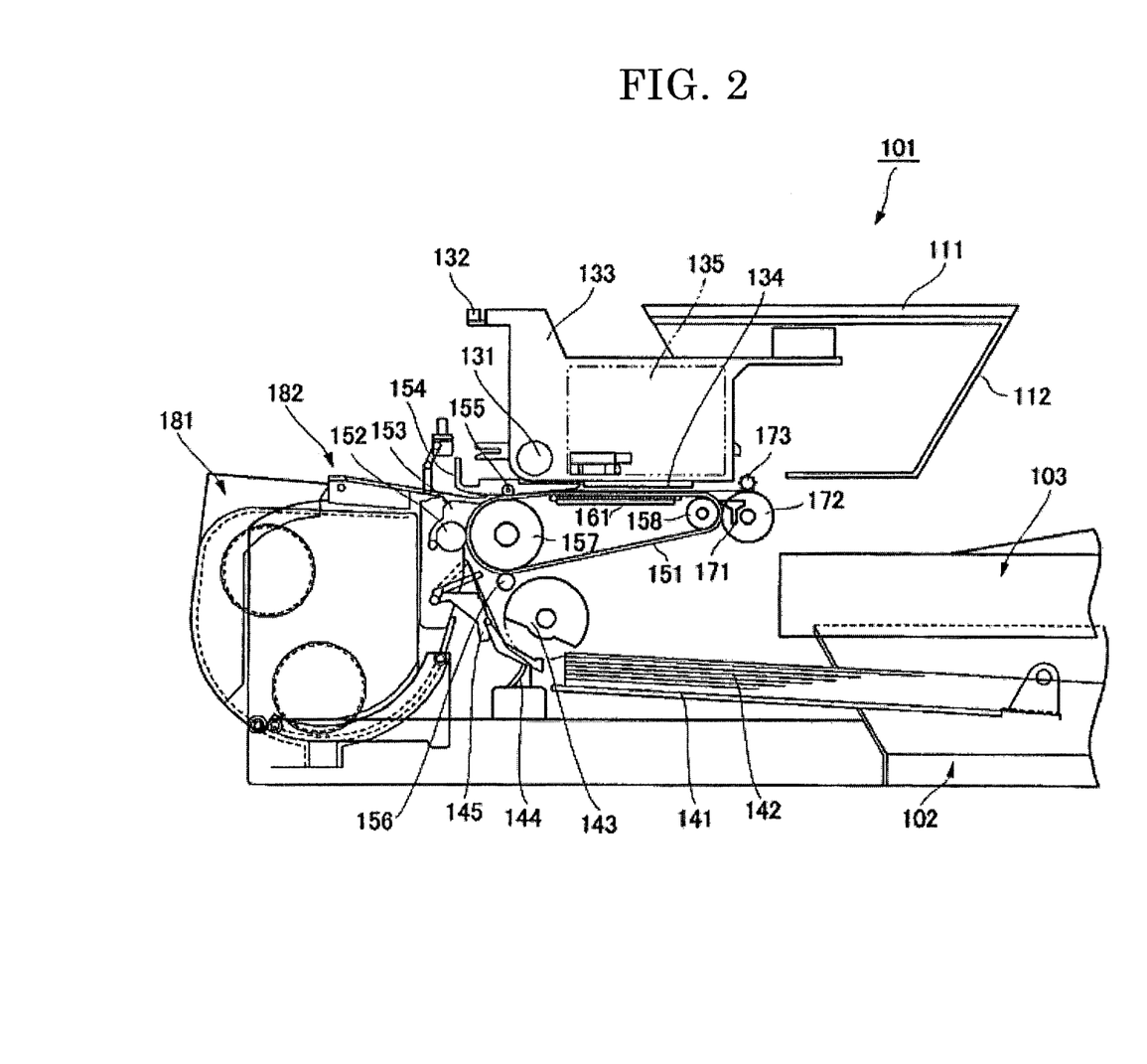
FIG. 2 is a schematic block diagram illustrating the overall structure of an inkjet recording apparatus.

In the apparatus body 101, as illustrated in FIG. 2, a carriage 133 is held free of sliding in the main scanning direction by a guide rod 131 and a stay 132, which are guide members laid across on lateral plates (not illustrated). Scanning is performed by a main scanning motor (not illustrated).

In the carriage 133, a recording head 134 including four inkjet recording heads which discharge recording ink drops for respective colors, yellow (Y), cyan (C), magenta (M), and black (Bk) is loaded, so that a plurality of ink discharge openings is arranged in the direction crossing the main scanning direction, and ink drop discharge direction is headed below.

As the inkjet recording head constructing the recording head 134, an inkjet recording head which includes a piezoelectric actuator such as a piezoelectric device, a thermal actuator which utilizes phase change due to film boiling of liquid by using an electrothermal conversion device such as a heating resistive element, a memory metal actuator which uses metal phase change due to temperature change, an electrostatic actuator which uses electrostatic power or the like as a measure for generating energy to discharge the recording ink can be used.

Further, the carriage 133 is provided with a sub tank 135 for each color to supply ink for each color to the recording head 134. The sub tank 135 is supplied and refilled with the recording ink of the present invention from the ink cartridge 200 which is loaded in the ink cartridge loading section 104 via a recording ink supply tube (not illustrated).

Meanwhile, as a paper feed part to feed paper 142 laded on a paper lading section (pressure plate) 141 of the paper feed tray 102, there are provided a semilunar roller (paper feed roller 143) which separately feed the paper 142 piece by piece from the paper lading section 141 and a separation pad 144 made of a material having a large friction coefficient, which faces the paper feed roller 143. This separation pad 144 is fixed to the paper feed roller 143 side.

As a conveyance part to convey the paper 142 fed from this paper feed part below the recording head 134, a conveyance belt 151 to electrostatically absorb and convey the paper 142, a counter roller 152 to carry the paper 142 fed from the paper feed part through a guide 145 by sandwiching the paper 142 between the counter roller 152 and the conveyance belt 151, a conveyance guide 153 to change the direction of the paper 142 fed approximately vertically over the paper feed part at an angle of about 90°, and let the paper 142 be taken along the conveyance belt 151, and an end pressure roller 155 fixed to the conveyance belt 151 side by a pressure member 154 are provided. Further, a charging roller 156 which is an electrification measure to charge a surface of the conveyance belt 151 is provided.

The conveyance belt 151 is an endless belt. The conveyance belt 151 is stretched between a conveyance roller 157 and a tension roller 158, and can go around in the belt conveyance direction. This conveyance belt 151 has a surface layer formed of a resin material (with no resistance control) having a thickness of about 40 μm, for example, a tetrafluoroethylene-ethylene copolymer (ETFE) and serving as a paper absorbing surface, and a back layer (medium resistance layer, grounding layer) provided with resistance control by carbon, which is the same material as used in the surface layer. A guide member 161 corresponding to a printing region by the recording head 134 is arranged on the rear side of the conveyance belt 151. As a paper ejection part to eject the paper 142 recorded by the recording head 134, a separation claw 171 to separate the paper 142 from the conveyance belt 151, a paper ejection roller 172, and a paper ejection roller 173 are provided, and the paper ejection tray 103 is arranged below the paper ejection roller 172.

A double-sided paper feed unit 181 is detachably loaded on the rear face part of the apparatus body 101. The double-sided paper feed unit 181 takes in the paper 142 returned by backward rotation of the conveyance belt 151, inverts the paper 142, and feeds the paper 142 again between the counter roller 152 and the conveyance belt 151. A manual paper feed section 182 is provided on the top face of the double-sided paper feed unit 181.

In this inkjet recording apparatus, the paper 142 is separately fed piece by piece from the paper feed part. Then, the paper 142 fed approximately vertically over the paper feed part is guided by the guide 145, and conveyed by being sandwiched between the conveyance belt 151 and the counter roller 152. Further, an end of the paper 142 is guided by the conveyance guide 153, and is pressed onto the conveyance belt 151 by the end pressure roller 155. Then, the conveyance direction of the paper 142 is changed at an angle of about 90°.

At this time, the conveyance belt 157 is charged by the charging roller 156, and therefore, the paper 142 is conveyed in the state where the paper 142 is electrostatically absorbed by the conveyance belt 151. By driving the recording head 134 correspondingly to image signals while moving the carriage 133, ink drops are discharged to the stopped paper 142 and one line is recorded. After the paper 142 is carried in a given amount, the next line is recorded. When a recording finish signal or a signal that a back end of the paper 142 reaches the recording region is received, recording operation is finished, and the paper 142 is ejected to the paper ejection tray 103.

When remaining amount near end of the recording ink inside the sub tank 135 is detected, a necessary amount of the recording ink is resupplied from the ink cartridge 200 to the sub tank 135.

In this inkjet recording apparatus, when the recording ink in the ink cartridge 200 is used up, it is possible to disassemble the housing in the ink cartridge 200 and replace only the interior ink bag. Further, the ink cartridge 200 can supply the recording ink stably even when the ink cartridge 200 is placed vertically and has a front loading construction.

Therefore, even when the installation is made in the state where a space over the top face of the apparatus body 101 is blocked off, for example, when the apparatus body 101 is housed in a rack, or objects are laid on the top face of the apparatus body 101, the ink cartridge 200 can be easily replaced.

Here, descriptions have been given of the case that the present invention is applied to a serial type (shuttle type) inkjet recording apparatus in which carriage performs scanning. However, the present invention can be similarly applied to a line type inkjet recording apparatus provided with a line type head.

(Inkjet Recording Method)

An inkjet recording method of the present invention is a method of discharging each ink in an inkjet recording ink set using an ink flying unit configured to make each of the inks fly by applying an impulse to each of the inks to thereby record an image.

The inkjet recording ink set is the inkjet recording set according to the present invention.

The inkjet recording apparatus is not particularly limited and may be suitably selected in accordance with the intended use. For example, an inkjet recording apparatus illustrated in FIG. 1 is exemplified.

Examples of the ink flying unit include a continuous jetting type or on-demand type ink flying units. Examples of the on-demand type ink flying unit include piezoelectric type, thermal type, and electrostatic units are exemplified. Among these, piezoelectric type and thermal type ink flying units are particularly preferable.

The impulse can be generated, for example, by an impulse generating unit. The impulse is not particularly limited and may be suitably selected in accordance with the intended use. Examples of the impulse include heat (temperature), pressure, vibration, and light. These may be used alone or in combination. Among these, heat and pressure are preferably exemplified.

The aspect of flying of the inkjet recording ink is not particularly limited, and it differs depending on the kind of the impulse. For example, when the impulse is "heat", there may be exemplified a method in which a heat energy corresponding to a recording signal is applied to the inkjet recording ink in a recording head using, for example, a thermal head or the like to generate air bubbles in the inkjet recording ink by the heat energy, and thereby the inkjet recording ink is discharged and jetted in the form of liquid droplets from nozzle holes of the recording head by the pressure of the air bubbles. In addition, when the impulse is "pressure", there may be exemplified a method in which an electric voltage is applied to a piezoelectric element bonded at a position called "a pressure chamber" provided inside the ink flow pass in a recording head to deflect the piezoelectric element and shrink the capacity of the pressure chamber, and thereby the inkjet recording ink is discharged and jetted in the form of liquid droplets from nozzle holes of the recording head.

(Recorded Matter)

A recorded matter of the present invention is a recorded matter recorded using an inkjet recording ink set.

The inkjet recording ink set is the inkjet recording ink set of the present invention.

Examples of the recorded matter include recorded matters having, on a recording medium, an image formed using the inkjet recording ink set of the present invention.

The recording medium is not particularly limited and may be suitably selected in accordance with the intended use. Examples of the recording medium include plain paper, glossy paper, specialty paper, cloth, films, and OHP sheets. These may be used alone or in combination.

EXAMPLES

Hereinafter, the present invention will be described in detail with reference to Examples and Comparative Examples. However, these Examples should not be construed as limiting the scope of the present invention.

Example 1

Black Ink 1-K
—Composition—

| | |
|---|---|
| Direct Black 195 (PRO-JET FAST BLACK 2 LIQUID, produced by Fuji Film Imaging Colorant Corp.) | 6.0 parts by mass |
| DISPANOL TOC (polyoxyethylene alkylene derivative, solid content: 100%, produced by NOF CORPORATION) | 0.5 parts by mass |
| lithium hydroxide | 0.2 parts by mass |
| PROXEL LV (produced by Avecia Biocides, antiseptic/fungicide) | 0.1 parts by mass |
| glycerin | 14.0 parts by mass |
| 3-methyl-1,3-butanediol | 14.0 parts by mass |
| 1,3-butanediol | 14.0 parts by mass |
| 2,2,4-trimethyl-1,3-pentanediol | 1.0 part by mass |
| ion exchanged water | 50.2 parts by mass |

The above-mentioned materials were dissolved in ion exchanged water, and then filtered through a filter with opening of 0.2 μm to obtain a black ink. The water-soluble solvent accounted for 43.0% by mass of the total mass of the ink, water accounted for 50.2% by mass of the total mass of the ink. The water-soluble solvent and water had a relationship of S (the amount of water-soluble solvent)<W (the amount of water), and S/W (mass ratio) was equal to 0.86.

<Cyan Ink 1-C>
—Composition—

| | |
|---|---|
| Direct Blue 86 (produced by Daiwa Kasei Industry Co., Ltd.) | 3.0 parts by mass |
| DISPANOL TOC (polyoxyethylene alkylene derivative, solid content: 100%, produced by NOF CORPORATION) | 0.5 parts by mass |
| lithium hydroxide | 0.2 parts by mass |
| PROXEL LV (produced by Avecia Biocides, antiseptic/fungicide) | 0.1 parts by mass |
| glycerin | 16.0 parts by mass |
| 3-methyl-1,3-butanediol | 16.0 parts by mass |
| 1,3-butanediol | 16.0 parts by mass |
| 2,2,4-trimethyl-1,3-pentanediol | 1.0 part by mass |
| ion exchanged water | 47.2 parts by mass |

The above-mentioned materials were dissolved in ion exchanged water, and then filtered through a filter with opening of 0.2 μm to obtain a cyan ink. The water-soluble solvent accounted for 49.0% by mass of the total mass of the ink, water accounted for 47.2% by mass of the total mass of the ink. The water-soluble solvent and water had a relationship of S (the amount of water-soluble solvent)>W (the amount of water), and S/W (mass ratio) was equal to 1.04.

<Magenta Ink 1-M>
—Composition—

| | |
|---|---|
| Reactive Red (PRO-JET MAGENTA 3B-OA LIQUID, produced by Fuji Film Imaging Colorant Corp.) | 2.5 parts by mass |
| DISPANOL TOC (polyoxyethylene alkylene derivative, solid content: 100%, produced by NOF CORPORATION) | 0.5 parts by mass |
| lithium hydroxide | 0.2 parts by mass |
| PROXEL LV (produced by Avecia Biocides, antiseptic/fungicide) | 0.1 parts by mass |
| glycerin | 16.0 parts by mass |
| 3-methyl-1,3-butanediol | 16.0 parts by mass |
| 1,3-butanediol | 16.0 parts by mass |
| 2,2,4-trimethyl-1,3-pentanediol | 1.0 part by mass |
| ion exchanged water | 47.7 parts by mass |

The above-mentioned materials were dissolved in ion exchanged water, and then filtered through a filter with opening of 0.2 μm to obtain a magenta ink. The water-soluble solvent accounted for 49.0% by mass of the total mass of the ink, water accounted for 47.7% by mass of the total mass of the ink. The water-soluble solvent and water had a relationship of S (the amount of water-soluble solvent)>W (the amount of water), and S/W (mass ratio) was equal to 1.03.

<Yellow Ink 1-Y>
—Composition—

| | |
|---|---|
| Acid Yellow (produced by Daiwa Kasei Industry Co., Ltd.) | 2.5 parts by mass |
| DISPANOL TOC (polyoxyethylene alkylene derivative, solid content: 100%, produced by NOF CORPORATION) | 0.5 parts by mass |
| lithium hydroxide | 0.2 parts by mass |
| PROXEL LV (produced by Avecia Biocides, antiseptic/fungicide) | 0.1 part by mass |
| glycerin | 16.0 parts by mass |
| 3-methyl-1,3-butanediol | 16.0 parts by mass |
| 1,3-butanediol | 16.0 parts by mass |
| 2,2,4-trimethyl-1,3-pentanediol | 1.0 part by mass |
| ion exchanged water | 47.7 parts by mass |

The above-mentioned materials were dissolved in ion exchanged water, and then filtered through a filter with opening of 0.2 μm to obtain a cyan ink. The water-soluble solvent accounted for 49.0% by mass of the total mass of the ink, water accounted for 47.7% by mass of the total mass of the ink. The water-soluble solvent and water had a relationship of S (the amount of water-soluble solvent)>W (the amount of water), and S/W (mass ratio) was equal to 1.03.

<Measurement and Evaluation>

Each of the inks (1-K, 1-C, 1-M, 1-Y) produced in Example 1 was measured for their various properties.

(1) Measurement of Flash Point

The flash point of the ink was measured through the Cleveland open-cup flash point test, in accordance with JIS-K2265. The results are shown in Tables 2-A and 2-B.

(2) Measurement of Viscosity

The viscosity of the ink at 25° C. was measured by RC-500, manufactured by TOKI SANGYO Co., Ltd. The results are shown in Tables 2-A and 2-B.

(3) Measurement of Discharge Stability

An inkjet recording apparatus (IPSIO G707, manufactured by Ricoh Company Ltd.) having a structure described in FIGS. 1 and 2 was used and filled with the ink set (1-K, 1-C, 1-M, 1-Y). Then, each of the inks was evaluated for the discharge stability according to the following method.

First, continuous printing was performed for 10 minutes, and the inkjet head was covered with a moisture retention cap with the ink kept adhering on the head surface, and the ink set was left standing under the conditions of 50° C. and 60% RH for one month. Thereafter, the inkjet head was cleaned to recover to the similar state before being left standing. Then, an intermittent printing test was performed under the following conditions to measure the discharge stability.

Specifically, 20 sheets of a print pattern chart described below were continuously printed and then the recording apparatus was put into suspend mode for 20 minutes. This operation was repeated 50 times to print 1,000 sheets in cumulative total, and then one more sheet of the same chart was printed. The presence or absence of streaks, white spots and jetting disturbance in a 5% solid part was visually observed, evaluated based on the following criteria. The evaluation results are shown in Tables 2-A and 2-B, and grades A and B are within the acceptable range.

[Print Pattern]

With a chart having a print area of 5% for each color in the total area of paper surface, each of the inks was printed on the paper with 100% duty under the printing conditions:

recording density: 300 dpi, and one pass printing.

[Evaluation Criteria]

A: No streak, white spot and jetting disturbance was found in the solid part.

B: Streaks, white spots and jetting disturbance were slightly recognized in the solid part.

C: Streaks, white spots and jetting disturbance were recognized in the solid part.

D: Streaks, white spots and jetting disturbance were recognized across the solid part.

(4) Color Bleed

The inkjet recording apparatus (IPSIO G707, manufactured by Ricoh Company Ltd.) having a structure described in FIGS. 1 and 2 was used and filled with the ink set (1-K, 1-C, 1-M, 1-Y). Then, each of the inks was evaluated for the color bleed according to the following method.

Specifically, using a print pattern in which letters printed with each black ink in a solid image part composed of different color inks of magenta, cyan, yellow, and red formed by mixing the magenta and the yellow on a recording medium, and green formed by mixing the cyan and the yellow on a recording medium, printing was performed on a test paper sheet, MY PAPER (produced by Ricoh Company Ltd.). The printing conditions were set to 100% duty, 300 dpi as recording density, and one pass printing. Solid parts of the red ink and the green ink formed by mixing the different color inks on the recording medium, and color bleed (bleeding) in letters of the black ink were visually observed and evaluated based on the following criteria. The evaluation results are shown in Table 3, grades A and B are within the acceptable range.

[Evaluation Criteria]

A: No color bleed was observed, and letters of the black ink were clearly recognized.

B: Slight amount of color bleed occurred, and letters of the black ink slightly oozed.

C: Color bleed occurred, and letters of the black ink oozed but recognized.

D: Color bleed occurred, and it was difficult to recognize letters of the black ink.

Examples 2 to 6 and Comparative Examples 1 to 5

Each ink (2-K to 11-K, 2-C to 11-C, 2-M to 11-M, and 2-Y to 11-Y) was produced in the same manner as in Example 1, except that the materials and the composition were respectively changed to those shown in the columns of Examples 2 to 6 and Comparative Examples 1 to 5 in Tables 1-A, 1-B and 1-C. Then, the properties of these inks were measured and evaluated. The results are shown in Tables 2-A, 2-B and 3, together with the value of S/W (mass ratio) of each of the inks, where S denotes an amount of water-soluble solvent, and W denotes an amount of ion exchanged water.

TABLE 1-A

| | | Coloring | | \multicolumn{7}{c}{Ink Composition} | | | | |
|---|---|---|---|---|---|---|---|---|---|---|---|---|---|---|
| | | | | \multicolumn{6}{c}{Water-soluble solvent} | Surfactant | \multicolumn{3}{c}{pH adjustor} | Antiseptic fungicide |
| Example | | material | Dye | GLY | MBD | 13BD | 2P | 224TM13PO | 2H13HD | TOC | LiOH | TEA | AEPD | LV |
| Ex. 1 | 1-K | Direct Black 195 | 6.0% | 14.0% | 14.0% | 14.0% | | 1.0% | | 0.5% | 0.2% | | | 0.1% |
| | 1-C | Direct Blue 86 | 3.0% | 16.0% | 16.0% | 16.0% | | 1.0% | | 0.5% | 0.2% | | | 0.1% |
| | 1-M | Reactive Red 31 | 2.5% | 16.0% | 16.0% | 16.0% | | 1.0% | | 0.5% | 0.2% | | | 0.1% |
| | 1-Y | Acid Yellow 23 | 2.5% | 16.0% | 16.0% | 16.0% | | 1.0% | | 0.5% | 0.2% | | | 0.1% |
| Ex. 2 | 2-K | Azo-based mixture | 6.0% | 26.0% | | 9.0% | 2.5% | 1.5% | | | | 0.5% | | 0.1% |
| | 2-C | Direct Blue 199 | 3.0% | 33.0% | | 11.0% | 3.0% | 1.5% | | | | 0.5% | | 0.1% |
| | 2-M | Acid Red 249 | 2.5% | 33.0% | | 11.0% | 3.0% | 1.5% | | | | 0.5% | | 0.1% |
| | 2-Y | Direct Yellow 142 | 2.5% | 33.0% | | 11.0% | 3.0% | 1.5% | | | | 0.5% | | 0.1% |
| Ex. 3 | 3-K | Direct Black 168 | 6.0% | 22.0% | | 22.0% | | | 2.0% | | | | 0.5% | 0.1% |
| | 3-C | Direct Blue 199 | 2.5% | 28.0% | | 28.0% | | | 2.0% | | | | 0.5% | 0.1% |
| | 3-M | Acid Red 249 | 2.0% | 28.0% | | 28.0% | | | 2.0% | | | | 0.5% | 0.1% |
| | 3-Y | Direct Yellow 132 | 1.4% | 28.0% | | 28.0% | | | 2.0% | | | | 0.5% | 0.1% |
| | | Direct Yellow 142 | 0.7% | | | | | | | | | | | |
| Ex. 4 | 4-K | Azo-based mixture | 6.0% | 10.0% | | 30.0% | | | 2.0% | | | | 1.0% | 0.1% |
| | 4-C | Direct Blue 199 | 2.5% | 13.0% | | 39.0% | | | 2.0% | | | | 1.0% | 0.1% |
| | 4-M | Acid Red 254 | 2.0% | 13.0% | | 39.0% | | | 2.0% | | | | 1.0% | 0.1% |
| | 4-Y | Direct Yellow 132 | 2.0% | 13.0% | | 39.0% | | | 2.0% | | | | 1.0% | 0.1% |

TABLE 1-B

| | | | | Ink Composition | | | | | | | | | |
|---|---|---|---|---|---|---|---|---|---|---|---|---|---|
| | | Coloring | | Water-soluble solvent | | | | | | Surfactant | pH adjustor | | Antiseptic/fungicide |
| Example | | material | Dye | GLY | MBD | 13BD | 2P | 224TM13PO | 2H13HD | TOC | LiOH TEA | AEPD | LV |
| Ex. 5 | 5-K | Azo-based mixture | 6.0% | 10.0% | | 26.5% | | | 2.0% | | | 1.0% | 0.1% |
| | 5-C | Direct Blue 199 | 2.5% | 14.3% | | 43.0% | | | 2.0% | | | 1.0% | 0.1% |
| | 5-M | Acid Red 254 | 2.0% | 14.5% | | 43.0% | | | 2.0% | | | 1.0% | 0.1% |
| | 5-Y | Direct Yellow 132 | 2.0% | 14.5% | | 43.0% | | | 2.0% | | | 1.0% | 0.1% |
| Ex. 6 | 6-K | Direct Black 168 | 9.0% | 17.5% | | 17.5% | | | 2.0% | | | 0.5% | 0.1% |
| | 6-C | Direct Blue 199 | 2.5% | 28.0% | | 30.0% | | | 2.0% | | | 0.5% | 0.1% |
| | 6-M | Acid Red 249 | 2.0% | 28.0% | | 30.0% | | | 2.0% | | | 0.5% | 0.1% |
| | 6-Y | Direct Yellow 132 | 1.4% | 28.0% | | 30.0% | | | 2.0% | | | 0.5% | 0.1% |
| | | Direct Yellow 142 | 0.7% | | | | | | | | | | |

TABLE 1-C

| | | | | Ink Composition | | | | | | | | | |
|---|---|---|---|---|---|---|---|---|---|---|---|---|---|
| | | Coloring | | Water-soluble solvent | | | | | | Surfactant | pH adjustor | | Antiseptic/fungicide |
| Example | | material | Dye | GLY | MBD | 13BD | 2P | 224TM13PO | 2H13HD | TOC | LiOH TEA | AEPD | LV |
| Comp. Ex. 1 | 7-K | Azo-based mixture | 6.0% | 12.5% | | 37.5% | | | 2.0% | | | 1.0% | 0.1% |
| | 7-C | Direct Blue 199 | 2.5% | 13.0% | | 39.0% | | | 2.0% | | | 1.0% | 0.1% |
| | 7-M | Acid Red 254 | 2.0% | 13.0% | | 39.0% | | | 2.0% | | | 1.0% | 0.1% |
| | 7-Y | Direct Yellow 132 | 2.0% | 13.0% | | 39.0% | | | 2.0% | | | 1.0% | 0.1% |
| Comp. Ex. 2 | 8-K | Azo-based mixture | 6.0% | 27.0% | | 9.0% | 3.0% | 1.5% | | | 0.5% | | 0.1% |
| | 8-C | Direct Blue 199 | 3.0% | 27.0% | | 9.0% | 3.0% | 1.5% | | | 0.5% | | 0.1% |
| | 8-M | Acid Red 249 | 2.5% | 27.0% | | 9.0% | 3.0% | 1.5% | | | 0.5% | | 0.1% |
| | 8-Y | Direct Yellow 142 | 2.5% | 27.0% | | 9.0% | 3.0% | 1.5% | | | 0.5% | | 0.1% |
| Comp. Ex. 3 | 9-K | Direct Black 195 | 6.0% | 15.0% | 15.0% | 15.0% | | 1.0% | | 0.5% | 0.2% | | 0.1% |
| | 9-C | Direct Blue 86 | 3.0% | 18.0% | 18.0% | 18.0% | | 1.0% | | 0.5% | 0.2% | | 0.1% |
| | 9-M | Reactive Red 31 | 2.5% | 18.0% | 18.0% | 18.0% | | 1.0% | | 0.5% | 0.2% | | 0.1% |
| | 9-Y | Acid Yellow 23 | 2.5% | 18.0% | 18.0% | 18.0% | | 1.0% | | 0.5% | 0.2% | | 0.1% |
| Comp. Ex. 4 | 10-K | Azo-based mixture | 6.0% | 26.0% | | 9.0% | 2.5% | 1.5% | | | 0.5% | | 0.1% |
| | 10-C | Direct Blue 199 | 3.0% | 30.0% | | 10.0% | 3.0% | 1.5% | | | 0.5% | | 0.1% |
| | 10-M | Acid Red 249 | 2.5% | 30.0% | | 10.0% | 3.0% | 1.5% | | | 0.5% | | 0.1% |
| | 10-Y | Direct Yellow 142 | 2.5% | 30.0% | | 10.0% | 3.0% | 1.5% | | | 0.5% | | 0.1% |
| Comp. Ex. 5 | 11-K | Azo-based mixture | 6.0% | 10.0% | | 30.0% | | | 2.0% | | | 1.0% | 0.1% |
| | 11-C | Direct Blue 199 | 2.5% | 13.0% | | 34.0% | | | 2.0% | | | 1.0% | 0.1% |
| | 11-M | Acid Red 254 | 2.0% | 13.0% | | 34.0% | | | 2.0% | | | 1.0% | 0.1% |
| | 11-Y | Direct Yellow 132 | 2.0% | 13.0% | | 34.0% | | | 2.0% | | | 1.0% | 0.1% |

Note:
Product names and manufacturers of the dyes (coloring material) described in the above column are as follows:
1-K Direct Black 195 PRO-JET FAST BLACK 2 LIQUID (Fuji Film Imaging Colorant Corp.)
1-C Direct Blue 86 DIRECT BLUE 86 (Daiwa Kasei Industry Co., Ltd.)
1-M Reactive Red 31 PRO-JET MAGENTA 3B-OA LIQUID (Fuji Film Imaging Colorant Corp.)
1-Y Acid Yellow 23 ACID YELLOW 23 (Daiwa Kasei Industry Co., Ltd.)
2-K Azo-based mixture BAYSCRIPT BLACK SP LIQUID (LANXESS Deutschland GmbH)
2-C Direct Blue 199 DUASYNJET CYAN FRL-SF LIQUID (Clariant Japan K.K.)
2-M Acid Red 249 JPD MAGENTA R-01 LIQUID (Nippon Kayaku Co., Ltd.)
2-Y Direct Yellow 142 JPD YELLOW R-NL LIQUID (Nippon Kayaku Co., Ltd.)
3-K Direct Black 168 DUASYN BLACK HEF-SF LIQUID (Clariant Japan K.K.)
3-C Direct Blue 199 DAIWA IJ BLUE 319HL (Daiwa Kasei Industry Co., Ltd.)
3-M Acid Red 249 PRO-JET MAGENTA 1 LIQUID (Fuji Film Imaging Colorant Corp.)
3-Y Direct Yellow 132 KST YELLOW J-GX LIQUID (Nippon Kayaku Co., Ltd.)
Direct Yellow 142 JPD YELLOW R-NL LIQUID (Nippon Kayaku Co., Ltd.)
4-K Azo-based mixture BAYSCRIPT BLACK SP LIQUID (LANXESS Deutschland GmbH)
4-C Direct Blue 199 PRO-JET CYAN 1 LIQUID (Fuji Film Imaging Colorant Corp.)
4-M Acid Red 254 ACID RED 254 (Daiwa Kasei Industry Co., Ltd.)
4-Y Direct Yellow 132 BAYSCRIPT YELLOW GGN LIQUID (LANXESS Deutschland GmbH)

TABLE 1-C-continued

| | | Ink Composition | | | | | | | | | | | |
|---|---|---|---|---|---|---|---|---|---|---|---|---|---|
| | Coloring | | Water-soluble solvent | | | | | Surfactant | pH adjustor | | | Antiseptic/fungicide |
| Example | material | Dye | GLY | MBD | 13BD | 2P | 224TM13PD | 2H13HD | TOC | LiOH | TEA | AEPD | LV |

5-K Azo-based mixture BAYSCRIPT BLACK SP LIQUID (LANXESS Deutschland GmbH)
5-C Direct Blue 199 PRO-JET CYAN 1 LIQUID (Fuji Film Imaging Colorant Corp.)
5-M Acid Red 254 ACID RED 254 (Daiwa Kasei Industry Co., Ltd.)
5-Y Direct Yellow 132 BAYSCRIPT YELLOW GGN LIQUID (LANXESS Deutschland GmbH)
6-K Direct Black 168 DUASYN BLACK HEF-SF LIQUID (Clariant Japan K.K.)
6-C Direct Blue 199 DAIWA IJ BLUE 319HL (Daiwa Kasei Industry Co., Ltd.)
6-M Acid Red 249 PRO-JET MAGENTA 1 LIQUID (Fuji Film Imaging Colorant Corp.)
6-Y Direct Yellow 132 KST YELLOW J-GX LIQUID (Nippon Kayaku Co., Ltd.)
Direct Yellow 142 JPD YELLOW R-NL LIQUID (Nippon Kayaku Co., Ltd.)
7-K Azo-based mixture BAYSCRIPT BLACK SP LIQUID (LANXESS Deutschland GmbH)
7-C Direct Blue 199 PRO-JET CYAN 1 LIQUID (Fuji Film Imaging Colorant Corp.)
7-M Acid Red 254 ACID RED 254 (Daiwa Kasei Industry Co., Ltd.)
7-Y Direct Yellow 132 BAYSCRIPT YELLOW GGN LIQUID (LANXESS Deutschland GmbH)
8-K Azo-based mixture BAYSCRIPT BLACK SP LIQUID (LANXESS Deutschland GmbH)
8-C Direct Blue 199 DUASYNJET CYAN FRL-SF LIQUID (Clariant Japan K.K.)
8-M Acid Red 249 JPD MAGENTA R-01 LIQUID (Nippon Kayaku Co., Ltd.)
8-Y Direct Yellow 142 JPD YELLOW J-GW LIQUID (Nippon Kayaku Co., Ltd.)
9-K Direct Black 195 PRO-JET FAST BLACK 2 LIQUID (Fuji Film Imaging Colorant Corp.)
9-C Direct Blue 86 DIRECT BLUE 86 (Daiwa Kasei Industry Co., Ltd.)
9-M Reactive Red 31 PRO-JET MAGENTA 3B-OA LIQUID (Fuji Film Imaging Colorant Corp.)
9-Y Acid Yellow 23 ACID YELLOW 23 (Daiwa Kasei Industry Co., Ltd.)
10-K Azo-based mixture BAYSCRIPT BLACK SP LIQUID (LANXESS Deutschland GmbH)
10-C Direct Blue 199 DUASYNJET CYAN FRL-SF LIQUID (Clariant Japan K.K.)
10-M Acid Red 249 JPD MAGENTA R-01 LIQUID (Nippon Kayaku Co., Ltd.)
10-Y Direct Yellow 142 JPD YELLOW J-GW LIQUID (Nippon Kayaku Co., Ltd.)
11-K Azo-based mixture BAYSCRIPT BLACK SP LIQUID (LANXESS Deutschland GmbH)
11-C Direct Blue 199 PRO-JET CYAN 1 LIQUID (Fuji Film Imaging Colorant Corp.)
11-M Acid Red 254 ACID RED 254 (Daiwa Kasei Industry Co., Ltd.)
11-Y Direct Yellow 132 BAYSCRIPT YELLOW GGN LIQUID (LANXESS Deutschland GmbH)

In Tables 1-A, 1-B and 1-C above, "%" is "% by mass". The balance of the composition is ion exchanged water.

The materials abbreviated in Tables 1-A, 1-B and 1-C are as follows:
GLY: glycerin
MBD: 3-methyl-1,3-butanediol
13BD: 1,3-butanediol
2P: 2-pyrrolidone
224TM13PD: 2,2,4-trimethyl-1,3-pentanediol
2E13HD: 2-ethyl-1,3-hexanediol
TOC: DISPANOL TOC
(polyoxyethylene alkylene derivative, solid content: 100%, produced by NOF CORPORATION)
LiOH: lithium hydroxide
TEA: triethanolamine
AEPD: 2-amino-2-ethyl-1,3-propanediol
LV: PROXEL LV (produced by Avecia Biocides, antiseptic/fungicide)

TABLE 2-A

| | | Amount of water-soluble solvent S | Amount of ion exchanged water W | S/W | Flash point (° C.) | Viscosity (mPa·s) | Discharge stability |
|---|---|---|---|---|---|---|---|
| Ex. 1 | 1-K | 43.0% | 50.2% | 0.86 | None | 16.5 | A |
| | 1-C | 49.0% | 47.2% | 1.04 | 95 | 18.2 | B |
| | 1-M | 49.0% | 47.7% | 1.03 | 95 | 17.5 | B |
| | 1-Y | 49.0% | 47.7% | 1.03 | 95 | 18.4 | B |
| Ex. 2 | 2-K | 39.0% | 54.4% | 0.72 | None | 5.0 | A |
| | 2-C | 48.5% | 47.9% | 1.01 | None | 6.3 | A |
| | 2-M | 48.5% | 48.4% | 1.00 | None | 5.9 | A |
| | 2-Y | 48.5% | 48.4% | 1.00 | None | 6.0 | A |
| Ex. 3 | 3-K | 46.0% | 47.4% | 0.97 | None | 10.2 | A |
| | 3-C | 58.0% | 38.9% | 1.49 | None | 9.9 | A |
| | 3-M | 58.0% | 39.4% | 1.47 | None | 10.8 | A |
| | 3-Y | 58.0% | 39.3% | 1.48 | None | 10.3 | A |
| Ex. 4 | 4-K | 42.0% | 50.9% | 0.83 | None | 7.6 | A |
| | 4-C | 54.0% | 42.4% | 1.27 | None | 8.2 | A |
| | 4-M | 54.0% | 42.9% | 1.26 | None | 8.5 | A |
| | 4-Y | 54.0% | 42.9% | 1.26 | None | 8.4 | A |
| Ex. 5 | 5-K | 38.5% | 54.4% | 0.71 | None | 7.2 | A |
| | 5-C | 59.3% | 37.1% | 1.598 | None | 20.0 | B |
| | 5-M | 59.5% | 37.4% | 1.59 | None | 19.7 | A |
| | 5-Y | 59.5% | 37.4% | 1.59 | None | 19.4 | A |
| Ex. 6 | 6-K | 37.0% | 53.4% | 0.69 | None | 9.6 | A |
| | 6-C | 60.0% | 36.9% | 1.63 | None | 14.5 | A |
| | 6-M | 60.0% | 37.4% | 1.604 | None | 15.2 | B |
| | 6-Y | 60.0% | 37.3% | 1.61 | None | 14.8 | B |

TABLE 2-B

| | | Amount of water-soluble solvent S | Amount of ion exchanged water W | S/W | Flash point (° C.) | Viscosity (mPa·s) | Discharge stability |
|---|---|---|---|---|---|---|---|
| Comp. Ex. 1 | 7-K | 52.0% | 40.9% | 1.27 | None | 8.5 | A |
| | 7-C | 54.0% | 42.4% | 1.27 | None | 8.2 | A |
| | 7-M | 54.0% | 42.9% | 1.26 | None | 8.5 | A |
| | 7-Y | 54.0% | 42.9% | 1.26 | None | 8.4 | A |
| Comp. Ex. 2 | 8-K | 40.5% | 52.9% | 0.77 | None | 5.5 | A |
| | 8-C | 40.5% | 55.9% | 0.72 | None | 4.9 | B |
| | 8-M | 40.5% | 56.4% | 0.72 | None | 4.8 | B |
| | 8-Y | 40.5% | 56.4% | 0.72 | None | 4.8 | A |

TABLE 2-B-continued

| | | Amount of water-soluble solvent S | Amount of ion exchanged water W | S/W | Flash point (°C.) | Viscosity (mPa·s) | Discharge stability |
|---|---|---|---|---|---|---|---|
| Comp. Ex. 3 | 9-K | 46.0% | 47.2% | 0.97 | 98 | 20.3 | D |
| | 9-C | 55.0% | 41.2% | 1.33 | 92 | 20.8 | C |
| | 9-M | 55.0% | 41.7% | 1.32 | 92 | 20.5 | C |
| | 9-Y | 55.0% | 41.7% | 1.32 | 92 | 21.0 | C |
| Comp. Ex. 4 | 10-K | 39.0% | 54.4% | 0.72 | None | 5.0 | A |
| | 10-C | 44.5% | 51.9% | 0.86 | None | 5.7 | A |
| | 10-M | 44.5% | 52.4% | 0.85 | None | 5.4 | B |
| | 10-Y | 44.5% | 52.4% | 0.85 | None | 5.5 | A |
| Comp. Ex. 5 | 11-K | 42.0% | 50.9% | 0.83 | None | 7.6 | A |
| | 11-C | 49.0% | 47.4% | 1.03 | None | 4.9 | A |
| | 11-M | 49.0% | 47.9% | 1.02 | None | 4.8 | A |
| | 11-Y | 49.0% | 47.9% | 1.02 | None | 4.8 | B |

TABLE 3

| Bleed | Black/Yellow | Black/Magenta | Black/Cyan | Black/Red | Black/Green |
|---|---|---|---|---|---|
| Ex. 1 | A | A | A | B | B |
| Ex. 2 | A | A | A | A | A |
| Ex. 3 | A | A | A | A | A |
| Ex. 4 | A | A | A | A | A |
| Ex. 5 | A | A | A | A | A |
| Ex. 6 | B | A | A | B | B |
| Comp. Ex. 1 | D | C | C | C | D |
| Comp. Ex. 2 | D | C | C | C | C |
| Comp. Ex. 3 | B | A | B | B | B |
| Comp. Ex. 4 | D | C | C | C | C |
| Comp. Ex. 5 | C | C | C | C | D |

REFERENCE SIGNS LIST

101 apparatus body
102 paper feed tray
103 paper ejection tray
104 ink cartridge loading section
105 operation section
111 top cover
112 front surface of the front cover
115 front cover
131 guide rod
132 stay
133 cartridge
134 recording head
135 sub tank
141 paper lading section
142 paper
143 paper feed roller
144 separation pad
145 guide
151 conveyance belt
152 counter roller
153 conveyance guide
154 pressure member
155 end pressure roller
156 charging roller
157 conveyance roller
158 tension roller
161 guide member
171 separation claw
172 paper ejection roller
173 paper ejection roller
181 double-sided paper feed unit
182 manual paper feed section
200 ink cartridge

The invention claimed is:

1. An inkjet recording ink set consisting essentially of:
a black ink; and
color inks,
wherein the black ink and the color inks each comprise a dye, a water-soluble solvent, and water and each have a viscosity of 5 mPa·s to 20 mPa·s at 25° C., and
wherein the respective color inks each satisfy a mass ratio relationship of S/W≥1, and the black ink satisfies a mass ratio relationship of S/W<1, where S denotes an amount of the water-soluble solvent contained in the respective inks, and W denotes an amount of the water contained in the respective inks.

2. The inkjet recording ink set of claim 1, wherein each of the color inks satisfies a mass ratio relationship of 1≤S/W≤1.6, and the black ink satisfies a mass ratio relationship of 0.7≤S/W<1.

3. The inkjet recording ink set of claim 1, wherein the color inks include a cyan ink, a magenta ink, and a yellow ink.

4. An inkjet recording method comprising:
discharging inks in an inkjet recording ink set with an ink flying unit configured to make the inks fly by applying an impulse to the inks, thereby record an image,
wherein the inkjet recording ink set consists essentially of:
a black ink; and
color inks,
wherein the black ink and the color inks each comprise a dye, a water-soluble solvent, and water and each have a viscosity of 5 mPa·s to 20 mPa·s at 25° C., and
wherein the respective color inks each satisfy a mass ratio relationship of S/W≥1, and the black ink satisfies a mass ratio relationship of S/W<1, where S denotes an amount of the water-soluble solvent contained in the respective inks, and W denotes an amount of the water contained in the respective inks.

5. A recorded matter,
wherein the recorded matter is recorded with an inkjet recording ink set consisting essentially of:
a black ink; and
color inks,
wherein the black ink and the color inks each comprise a dye, a water-soluble solvent and water and each have a viscosity of 5 mPa·s to 20 mPa·s at 25° C., and
wherein the respective color inks each satisfy a mass ratio relationship of S/W≥1, and the black ink satisfies a mass ratio relationship of S/W<1, where S denotes an amount of the water-soluble solvent contained in the respective inks, and W denotes an amount of the water contained in the respective inks.

6. The inkjet recording method of claim 4, wherein each of the color inks satisfies a mass ratio relationship of 1≤S/W≤1.6, and the black ink satisfies a mass ratio relationship of 0.7≤S/W<1.

7. The inkjet recording method of claim 4, wherein the color inks comprise a cyan ink, a magenta ink, and a yellow ink.

8. The recorded matter of claim 5, wherein each of the color inks satisfies a mass ratio relationship of 1≤S/W≤1.6, and the black ink satisfies a mass ratio relationship of 0.7≤S/W<1.

9. The recorded matter of claim 5, wherein the color inks comprise a cyan ink, a magenta ink, and a yellow ink.

10. The inkjet recording set of claim 1, wherein the water-soluble solvent comprises glycerin, diethylene glycol, triethylene glycol, 1,3-butanediol, 1,6-hexanediol, propylene glycol, 1,5-pentanediol, dipropylene glycol, trimethylol propane, 3-methyl-1,3-butanediol, or any mixture thereof.

11. The inkjet recording set of claim 10, wherein the water-soluble solvent comprises glycerin.

12. The inkjet recording set of claim 10, wherein the water-soluble solvent comprises 3-methyl-1,3-butanediol.

13. The inkjet recording set of claim 10, wherein the water-soluble solvent comprises 1,3-butanediol.

14. The inkjet recording set of claim 1, wherein the black ink and the color inks each comprise a pH adjustor.

15. The inkjet recording set of claim 14, wherein the pH adjustor comprises an alcohol amine, an alkali metal hydroxide, a phosphonium hydroxide, or an alkali metal carbonate.

16. The inkjet recording set of claim 15, wherein the pH adjustor comprises an alcohol amine selected from the group consisting of diethanol amine, triethanol amine, and 2-amino-2-ethyl-1,3-propanediol.

17. The inkjet recording set of claim 15, wherein the pH adjustor comprises an alkali metal hydroxide selected from the group consisting of lithium hydroxide, sodium hydroxide, and potassium hydroxide.

18. The inkjet recording set of claim 15, wherein the pH adjustor comprises a phosphonium hydroxide selected from the group consisting of ammonium hydroxide, quaternary ammonium hydroxide, and quaternary phosphonium hydroxide.

19. The inkjet recording set of claim 15, wherein the pH adjustor comprises an alkali metal carbonate selected from the group consisting of lithium carbonate, sodium carbonate, and potassium carbonate.

20. The inkjet recording ink set of claim 1, wherein the inkjet recording ink set consists of the black ink and the color inks.

* * * * *